May 10, 1927.
G. E. PETERSEN
1,628,512
CONVEYER LUBRICATOR
Filed July 18, 1924
3 Sheets-Sheet 1
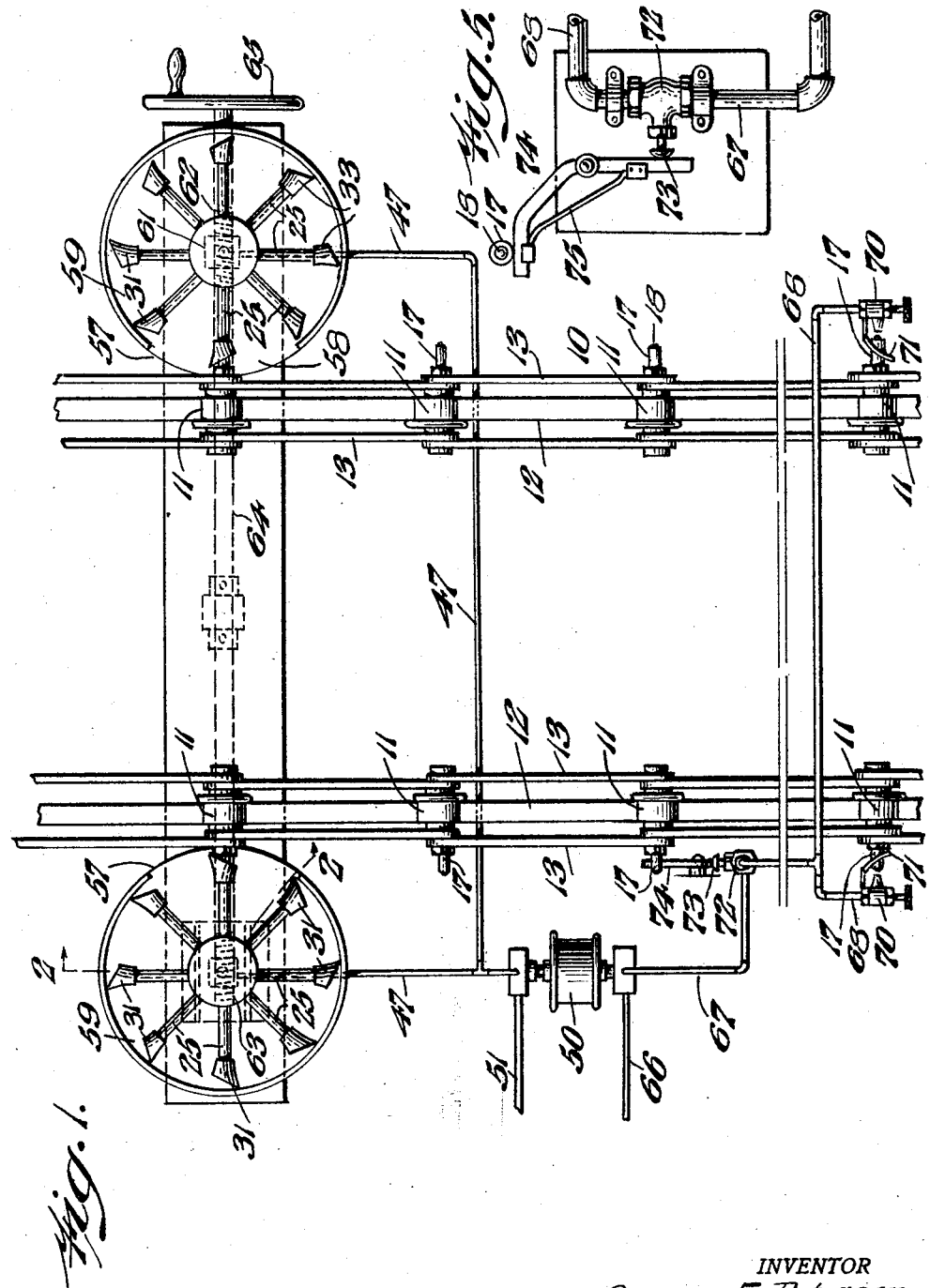
INVENTOR
George E. Petersen.
BY
Robert M. Barr
ATTORNEY

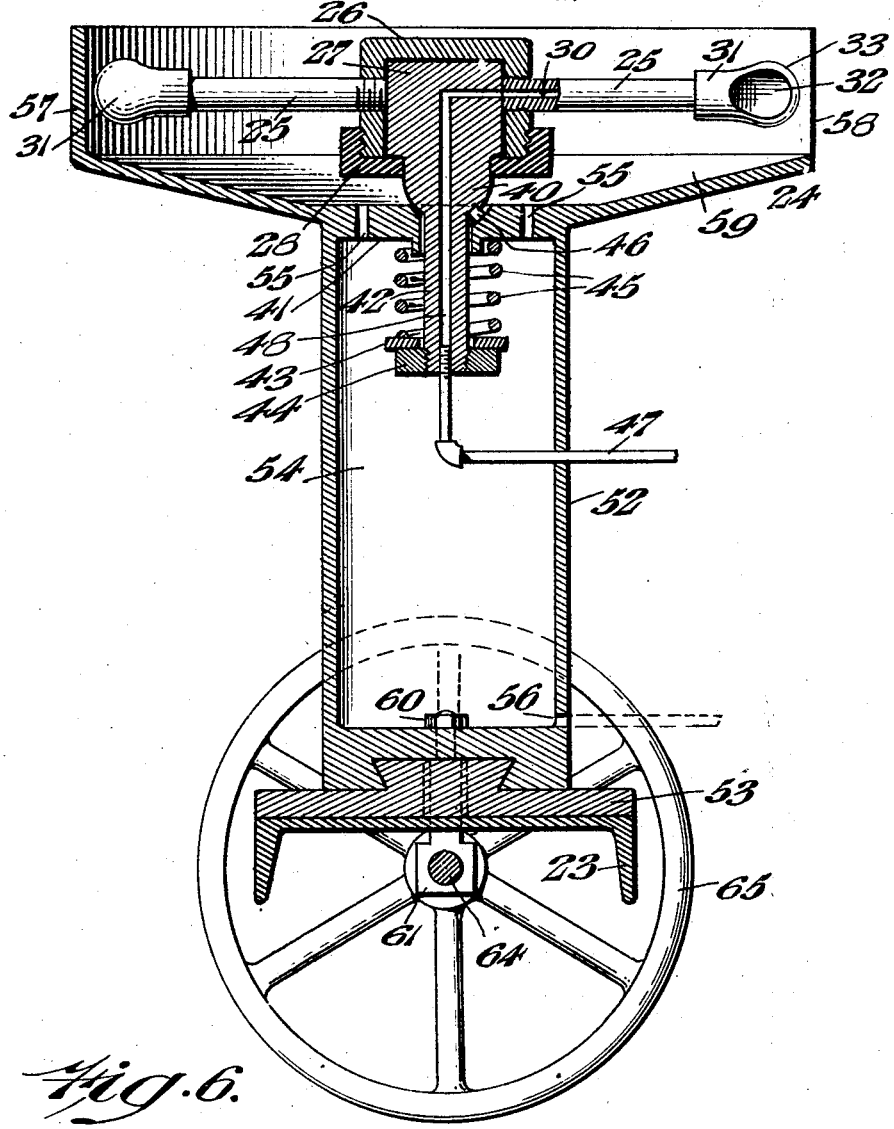
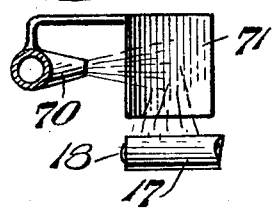

May 10, 1927.
G. E. PETERSEN
CONVEYER LUBRICATOR
Filed July 18, 1924
1,628,512
3 Sheets-Sheet 3
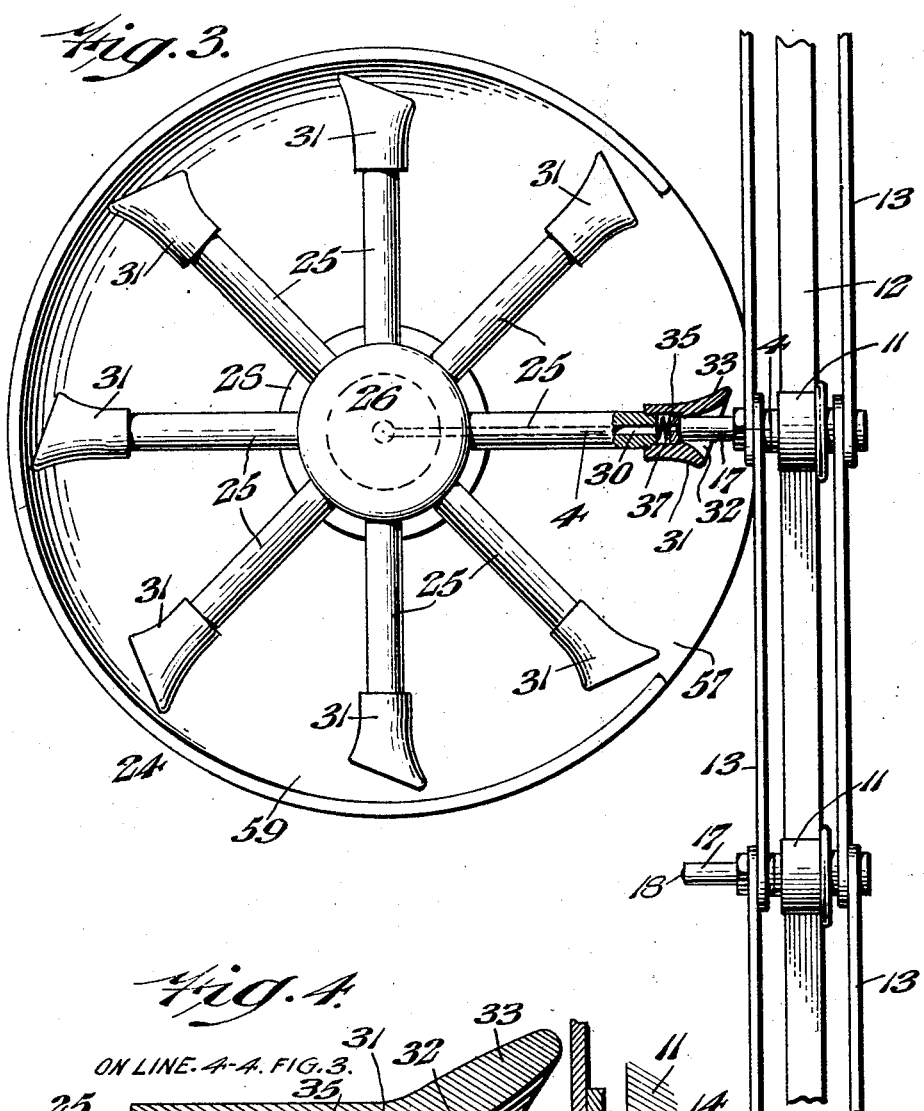
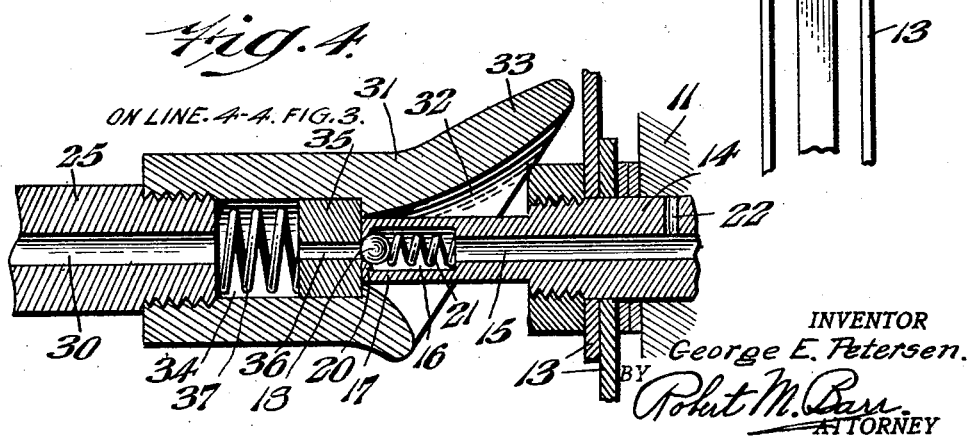
INVENTOR
George E. Petersen.
BY
Robert M. Barr
ATTORNEY Patented May 10, 1927.

1,628,512

UNITED STATES PATENT OFFICE.

GEORGE E. PETERSEN, OF BRISTOL, PENNSYLVANIA.

CONVEYER LUBRICATOR.

Application filed July 18, 1924. Serial No. 726,894.

The present invention relates to mechanical lubricators and more particularly to an automatic device for lubricating the journals of an endless conveyer.

Some of the objects of the present invention are to provide an improved means for lubricating the bearings of bucket or other type of endless conveyers; to provide means for eliminating the tedious and difficult manual lubrication of conveyers; to provide a combined cleaning and lubricating device for the bearings of conveyers; to provide means for supplying a predetermined quantity of oil to each bearing of a conveyer; to provide an automatic lubricator in which loss of oil is prevented; and to provide other improvements as will hereinafter appear.

In the accompanying drawings, Fig. 1 represents a plan of a portion of a conveyer mechanism arranged in operative relation to an automatic oiler embodying one form of the present invention; Fig. 2 represents an enlarged section on line 2—2 of Fig. 1; Fig. 3 represents a plan in part section of one side of the oiler and a conveyer section in oiling position; Fig. 4 represents an enlarged detail section on line 4—4 of Fig. 3; Fig. 5 represents an enlarged detail in side elevation of the valve actuating means; and Fig. 6 represents a detail in part section of the spray nozzle construction.

Referring to the drawings, a conveyer 10 is shown by way of example comprising wheels 11 supported by and traveling on tracks 12 which are suitably spaced apart in accordance with the size and arrangement of the buckets or other load carrying means of the conveyer. The wheels 11 of each track are interconnected by links 13 which form substantially the individual truck frames which support the respective buckets. The wheels 11 are journalled respectively on stub axles 14, each of which is provided with an oil passage 15, preferably axially disposed and opening at its outer end in a chamber 16 formed in an extension 17 of the axle 14 and which projects a predetermined distance to the outer side of the conveyer. The end of this chamber 16 is provided with an inlet port 18 controlled by a check valve 20 acted upon by a coil spring 21 so that it is normally closed to escape of oil from the passage 15 but is free to open by exterior pressure. A port 22 is radially formed in the axle 14 to establish communication between the oil passage 15 and the bearing surface of the wheel 11. From the foregoing it will be understood that the pairs of conveyer wheels 11 are all of like construction and the set of wheels on one track have extensions 17 projecting laterally to the outside of the track while the other set of wheels on the other track have extensions 17 projecting in the opposite direction on the other side of the track.

For the purpose of automatically supplying oil to the axles 14 a channel beam or other frame 23 is suitably mounted transversely of the conveyer tracks 12 but removed from the path of the conveyer buckets or associated parts in order not to obstruct the proper operation of the conveyer. The outer ends of the beam 23 respectively carry oil feeding devices 24 one of which is arranged to cooperate with one set of oil receiving extensions 17, and the other of which is arranged to cooperate with the other set of oil receiving extensions 17. As the feeding devices 24 are of like construction, the description will be confined to one, and corresponding reference numerals applied to like parts of the other. The oil delivery means consists of a plurality of radially arranged arms 25 extending in spoke formation from a hub 26 which is in the form of a cap seating over the end of the head 27 which is arranged as a vertical fixed axis about which the hub 26 rotates. The lower end of the head 27 passes through an annular collar 28 which has threaded engagement with the hub 26 to hold the latter properly seated upon the head 27. The discharge arms 25 are each provided with an axially disposed passage 30 opening at the discharge end into a nozzle 31 provided with a flaring mouth 32, one lip 33 of which is longer than the other and projects into the path of the axle extensions 17 when the parts are in operative position. The nozzle 31 is of internal shouldered construction to provide a chamber 34 in which is located a follower block 35 having a port 36 therethrough and a coil spring 37 normally holding the block pressed toward the mouth 32. This chamber 34 is in direct communication with the passage 30 of the connected arm 25.

In order to allow for a limited self-adjustment of the discharge arms 25 with respect to the conveyer extensions 17, the head 27 is integral with a ball-like member 40 seating upon a plate 41 through which passes the pipe end 42 of the aforesaid head 27. This end 42 carries a follower 43 held by a nut 44 to place a coil spring 45 under compression against the plate 41. This construction provides a yielding of the axis of rotation and a consequent adjustment of the discharge ends of the arms 25. The head 27 is prevented from rotary movement by a key 46 cooperating with the plate 41 but shaped to follow the slight axial variations of the ball member 40. Oil is supplied by a pipe 47 to a passage 48 extending axially of the head 27 and its parts to a point in the plane of the passages 30 in the arms 25 where it turns so that its discharge end is in register with the respective passages 30 of the arms 25 as they are successively brought into oil feeding position. Any suitable oil pump 50, such as a centrifugal pump, serves to deliver oil from the source pipe 51 to the pipes 47 which lead respectively to the two feeding devices 24.

For moving the feeding devices 24 into and out of operative position each is mounted upon a tubular pedestal 52 supported for sliding movement in dove-tail relation with a bed plate 53 which is carried by the frame or beam 23. The pedestal 52 in the present instance has the plate 41 as a top and encloses a chamber 54 into which drip or waste oil is conducted by way of ports 55 in the plate 41 and from which it can be drawn off by way of outlet 56. The pedestal 52 is surmounted by a receptacle 57 having an opening 58 opposite the oil delivery point and provided with a bottom 59 converging toward the plate openings 55. The pedestals 52 are respectively fastened by bolts 60 to the threaded leader nuts 61 which respectively engage right and left hand threaded portions 62 and 63 of a shaft 64 which carries an operating wheel 65 on one end thereof. By this construction the two feeding devices 24 can be simultaneously fed toward each other until their position is such that the axle extensions 17 of the conveyer will pick up the respective nozzles 31 at a point in advance of the oil discharge point. When the devices 24 are so positioned the extensions 17 will successively engage the respective nozzles 31 and cause the hub 26 to rotate on the head 27. Each extension 17 is arranged to first engage the lip 33 of the nozzle 31 in its path and then as motion is transmitted to the arm 25 the nozzle 31 moves over the end of the extension until the arm 25 brings its passage 30 into register with the discharge end of the passage 48 when the end of the extension is seated against the spring pressed block 35 to form a tight joint. At this instant the oil under pressure has free access to the passage 15 and a predetermined quantity of oil is ejected and is forced into the wheel bearings. As soon as the arm 25 moves out of register with the passage 48 by reason of the travel of the conveyer the oil discharge is cut off.

In order to clean the extension 17 and to prevent grease and dirt from clogging the valve controlled passage 15, the pump 50 is of the duplex centrifugal type and is connected at one side to a kerosene supply 66 which is delivered by pipe 67 to the distributing pipes 68, which terminate respectively at opposite sides of the conveyer track and have nozzles 70 which project the kerosene or other cleaning liquid over the extensions 17 as these latter pass in close proximity to the discharge nozzles 70. To more effectively distribute the cleaning fluid over the extension 17 the nozzles 70 are so disposed as to project the discharged oil against curved flaring deflectors 71, which act to distribute the sprays of oil over the respective extensions 17.

For controlling the supply of cleaning liquid the pipe 67 is provided with a valve 72 which is normally closed by a valve closure including a plunger 73 which is normally pressed outwardly by suitable spring means and seats against a pivoted operating lever 74, one arm of which is held by a spring 75 in the path of movement of the aforesaid extensions 17. The distance between the contact point of the extension 17 with the arm 74 and the nozzle 70 is substantially the same as the distance between two adjacent extensions 17 so that as the conveyer moves the forward extension 17 will trip the lever 74 to open the valve 72 just at the moment that the following extension 17 is in operative relation with respect to the discharge nozzle 70 and therefore receives a jet of the cleaning liquid. As soon as the extension 17 which engages the lever 74 moves beyond this lever the spring 75 returns the lever to its normal position and thus allows the valve 72 to close and cut off the supply of liquid. It will be understood that this opening of the valve 72 controls both of the jets so that extensions at opposite sides of the conveyer are simultaneously cleaned.

In the operation of the lubricator the oil feeding devices are normally fixed in position at opposite sides of the conveyer track and in such position that the rotation of the feed screw 64 will bring the two devices into operative relation with the conveyer when it is desired to lubricate it and will move them away when the conveyer is not to be lubricated. In Fig. 1 the devices are shown in operative position and as so positioned one of the supply nozzles 31 of each device is in the path of movement of the oppositely projecting extensions 17 of the wheel bearings, so that as the conveyer travels in the ordinary manner along its track the aforesaid extensions 17 will in due course engage the lips 33 of the respective nozzles. When this happens the continued movement of the conveyer transmits rotary movement to the nozzle arms and head 26, and this rotative movement advances the nozzle well over the extensions 17 so that its ends is finally brought into contact with the follower block 35. At the moment this contact is made the passage 30 of the engaged arm 25 comes into register with the oil supply duct 48 and the pressure thereupon forces out a small quantity of oil which is projected through the passage 15 to the bearing points of the wheel. This operation continues and as each wheel comes into position adjacent an oil feeding device its extension 17 will pick up one of the projecting arms 25 and at the proper time receive a supply of oil to its interior. In the preferred form of the invention the extension pins are sprayed by the nozzles 70 with kerosene or other cleaning fluid so that they are maintained clean and free from dirt and heavy grease. When the oiling operation has been completed the hand wheel 65 is rotated in the proper direction to withdraw the oil supplying devices away from the path of the conveyer and the latter continues to function until it is again necessary to oil it.

It will now be apparent that a complete unitary lubricating system has been provided for conveyers which is simple in construction, effective in operation, and by which a great saving of time is obtained over the heretofore usual hand oiling method and by which all of the bearings are thoroughly lubricated and maintained in operative condition at all times.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. In a lubricating mechanism, a head having a discharge port, a source of oil under pressure communicating with said head, a plurality of nozzle members arranged to move one at a time into communication with said port, a spring pressed follower provided with a port in each nozzle, and oil conveying means on said conveyer arranged to move said nozzles and engage the respective followers whereby the parts of said conveyer are lubricated without leakage.

2. In a lubricating mechanism, a head having a discharge port, a plurality of nozzle members rotatably mounted on said head, said members respectively having passages arranged to be brought successively into register with said port, means yieldingly mounting said head for vertical displacement, and oil conveying means on a conveyer arranged to engage said nozzles one at a time to move said nozzles into register with said port.

3. In a lubricating mechanism, a head having a discharge port, a plurality of nozzle members rotatably mounted on said head, said members respectively having passages arranged to be brought successively into register with said port, a receptacle open at one side for partially enclosing said members, a hollow pedestal supporting said receptacle, means to drain said receptacle into said pedestal, and oil conveyer means on a conveyer arranged to engage said nozzles one at a time to move said nozzles into register with said port.

4. In a lubricating mechanism, a head having a discharge port, a plurality of nozzle members rotatably mounted on said head, said members respectively having passages arranged to be brought successively into register with said port, a receptacle open at one side for partially enclosing said members, a hollow pedestal supporting said receptacle, means to drain said receptacle into said pedestal, means for moving said pedestal towards and away from a conveyer, and oil conveyer means on said conveyer arranged to engage said nozzles one at a time to move said nozzles into register with said port.

5. In a lubricating mechanism, a head having a discharge port, a plurality of nozzle members rotatably mounted on said head, said members respectively having passages arranged to be brought successively into register with said port and also having flaring mouths formed with projecting lips and tubular extensions formed on a conveyer part for respectively engaging said lips and seating in said mouths, said extensions under the movement of said conveyer causing said nozzle members to rotate into register with said ports.

6. In a lubricating mechanism, a source of oil under pressure, an oil discharge device, means actuated by a part of a conveyer for establishing a communication between said device and said oil source to oil the bearings of said conveyer, and spray means for automatically cleaning said part prior to the oiling operation.

7. In a lubricating mechanism, a source of oil under pressure, a plurality of oil discharge nozzles, conveyer means for respectively moving said nozzles one at a time into communication with said source of oil to oil the bearings of said conveyer, and spray means for automatically cleaning said part prior to the oiling operation.

Signed at Philadelphia, county of Philadelphia, State of Pennsylvania, this 3rd day of July, 1924.

GEORGE E. PETERSEN.